UNITED STATES PATENT OFFICE.

ELI SWEET, OF BINGHAMTON, NEW YORK, ASSIGNOR TO JOSEPH W. BOYD, OF DENVER, COLORADO.

METHOD OF HARDENING IRON AND STEEL.

1,121,572.  Specification of Letters Patent.  Patented Dec. 15, 1914.

No Drawing.  Application filed October 6, 1911.  Serial No. 653,206.

*To all whom it may concern:*

Be it known that I, ELI SWEET, a citizen of the United States, residing at Binghamton, in the county of Broome and State of New York, have invented certain new and useful Improvements in Methods of Hardening Iron and Steel, of which the following is a specification.

This invention relates to methods of hardening and toughening iron and steel.

I have discovered that iron or steel immersed in a heating bath containing animal charcoal, and quenched in an oil bath, may by proper manipulation be given a hard shell of any desired thickness, or may be hardened throughout, and that in addition to giving the metal such hardness it is given greater tensile strength than has been possible, so far as I am aware, by any other method.

In carrying out my method, an article of iron or steel, or that part of it which is to be hardened is first heated to a bright red. The heating is preferably done by immersing the metal in a bath of fluid maintained at a high degree of heat. I have found that for this purpose cyanid of potassium is a heating agent which can be used to advantage. When cyanid of potassium is used it is heated in a proper receptacle until it becomes melted and is raised to a high temperature, and I then add to it a quantity of powdered charcoal. The charcoal is added to the cyanid of potassium in small quantities until the mixture begins to give off bubbles, and I find that a quantity of charcoal added as described and which will produce the effect referred to is particularly well adapted for the purposes of my method.

While several forms of animal charcoal are available for use in combination with melted cyanid of potassium, I prefer to use charcoal obtained from leather, subjected to the heat of wood charcoal, the charring of the leather in preparing the animal charcoal being done in contact with such charcoal. After the leather is charred it is for convenience in handling, and in order to adapt it for ready mixing with the melted cyanid of potassium preferably reduced to a powdered form.

In carrying out my method the iron or steel to be hardened is allowed to remain in the heating fluid until it becomes red and it is then quenched, preferably in an oil or in a combination of oils. It is preferable that the oil or oils shall be slow burning and of a nature which will prevent rapid carbonization. Practice has demonstrated that a mixture of oils consisting of the following in approximately the quantities specified gives entirely satisfactory results: crude petroleum 1 gal.; common kerosene 1 qt.; palm oil 4 oz.; Atlantic red 2 oz. The combination of oils specified is, before the heated iron or steel is immersed in it, thoroughly incorporated by stirring. The combination of oils is preferably introduced into a tank containing water which is cooled and maintained in a cooled condition during the carrying out of the method.

After the article of iron or steel has been heated as described it is introduced into the oil compound. If the article is to be hardened throughout the entire portion heated, it is passed as rapidly as possible through the oil compound and into the cooled water beneath upon which the compound floats. If only a thin hard shell is to be produced, the article is immersed in the oil alone and is held stationary therein until the heat is reduced below the tempering heat. When a thicker coat or shell than that produced by the process next above described is desired the heated article is placed in the oil compound and moved about therein, thus bringing it constantly into contact with the unheated portions of the compound, the more rapid the movement given the article through the compound until it becomes cooled, the deeper will be the hard shell given the article. Thus after short practice of the method an operator is able to give any required depth of hardened surface to an article.

While I have herein particularly described cyanid of potassium as the heating medium, and have specifically mentioned certain oils and the proportions of oils employed in the quenching compound, it is to be understood that I do not thereby intend to limit the scope of my claims. The essentials of the method are the heating of an article to be hardened in a fluid containing animal charcoal, and the quenching of the article in an oil or a combination of oils.

As the described method imparts toughness and great tensile strength to an article treated by it, it is unnecessary to draw the temper. The hardening of metal to any desired depth, in the time usually required to temper it, and avoiding the long process now necessary in case hardening effects a great saving in expense.

Having thus described my invention, what I claim as new, and desire to secure by Letters Patent is:

1. The method of hardening iron or steel which consists in heating cyanid of potassium until a molten mass is obtained, adding pulverized animal charcoal to such molten mass, immersing iron or steel for a suitable length of time in such molten mass and then in removing the iron or steel from the molten mass and quenching it in oil.

2. The method of hardening iron or steel which consists in heating cyanid of potassium until a molten mass is obtained, adding pulverized animal charcoal to such molten mass until bubbles are given off, immersing iron or steel for a suitable length of time in such molten mass and then in removing the iron or steel from the molten mass and quenching it in oil.

In testimony whereof I affix my signature in presence of two witnesses.

ELI SWEET.

Witnesses:
F. C. CARL,
EDNA T. MANGAN.